(12) United States Patent
Bennett et al.

(10) Patent No.: US 8,838,145 B2
(45) Date of Patent: Sep. 16, 2014

(54) ACCESSING NAVIGATION INFORMATION VIA A GLOBAL POSITIONING GROUP SUPPORT SERVER

(75) Inventors: James Bennett, Hroznetin (CZ); Jeyhan Karaoguz, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 891 days.

(21) Appl. No.: 12/323,414

(22) Filed: Nov. 25, 2008

(65) Prior Publication Data
US 2010/0127924 A1    May 27, 2010

(51) Int. Cl.
| | |
|---|---|
| H04W 24/00 | (2009.01) |
| H04B 7/00 | (2006.01) |
| G01S 19/03 | (2010.01) |
| H04L 29/08 | (2006.01) |
| H04W 4/20 | (2009.01) |
| G01S 5/00 | (2006.01) |
| H04W 4/02 | (2009.01) |
| H04W 4/08 | (2009.01) |

(52) U.S. Cl.
CPC ............... *G01S 5/0027* (2013.01); *H04L 67/18* (2013.01); *H04W 4/20* (2013.01); *H04W 4/08* (2013.01); *G01S 5/0072* (2013.01); *H04W 4/023* (2013.01); *H04W 4/02* (2013.01)
USPC .................. 455/456.3; 455/456.6; 455/456.2; 455/518; 342/357.4

(58) Field of Classification Search
CPC ..... G01S 5/0027; G01S 5/0072; H04L 67/18; H04W 4/02; H04W 4/023
USPC ............ 455/456.3, 456.6, 456.2, 456.1, 515, 455/445, 518; 342/357.4; 709/206; 701/200, 211
See application file for complete search history.

(56) References Cited

U.S. PATENT DOCUMENTS

| | | | |
|---|---|---|---|
| 2003/0100326 A1* | 5/2003 | Grube et al. ................... | 455/515 |
| 2005/0234637 A1* | 10/2005 | Obradovich et al. ......... | 701/200 |
| 2005/0277427 A1* | 12/2005 | Zhang ......................... | 455/456.1 |
| 2007/0225016 A1* | 9/2007 | Jendbro et al. .............. | 455/456.1 |
| 2008/0228654 A1* | 9/2008 | Edge ............................. | 705/71 |
| 2009/0319616 A1* | 12/2009 | Lewis et al. ................... | 709/206 |
| 2011/0044246 A1* | 2/2011 | Fishler .......................... | 370/328 |

* cited by examiner

Primary Examiner — Opiribo Georgewill
(74) Attorney, Agent, or Firm — Brinks Gilson & Lione

(57) ABSTRACT

A client device transmits a GNSS address to gain navigation information such as map data from a global positioning group support server. The global positioning group support server may provide navigation information of global positioning groups in the vicinity of the client device based on the received GNSS address. The GNSS address of the client device may be an inherent GNSS address or a GNSS address of a neighboring client device. Client devices are registered and divided into global positioning groups at a global positioning group support server based on corresponding GNSS addresses. A particular client device may be added or removed to or from a given global positioning group. Uni- and bi-directional association tracking within a determined time window is enabled based on corresponding GNSS addresses. Phantom GNSS moving is enabled via the association tracking.

20 Claims, 11 Drawing Sheets

150 Global Positioning Group

Global Positioning Group Support Server 110

ACCESSING NAVIGATION INFORMATION VIA A GLOBAL POSITIONING GROUP SUPPORT SERVER

CROSS-REFERENCE TO RELATED APPLICATIONS/INCORPORATION BY REFERENCE

Not applicable

FIELD OF THE INVENTION

Certain embodiments of the invention relate to signal processing for communication systems. More specifically, certain embodiments of the invention relate to a method and system for accessing navigation information via a global positioning group support server.

BACKGROUND OF THE INVENTION

In recent years, various navigation systems for location based services (LBS) has spread wherein positional information of a client device such as a cell phone is acquired, for example, from global navigation satellite system (GNSS) such as global positioning satellites (GPS), Galileo and GLONASS, or from a remote navigation server coupled to the Internet. The client device communicates with the navigation server via a communication system. Based on the acquired positional information, for example, map data, the current position of the client device, and a recommendation route to a destination is displayed.

The client devices comprise wired and/or wireless capabilities that enable communication with wired and/or wireless communication systems. The wired communication systems comprise the Public Switched Telephone Network (PSTN), Wide Area Networks (WANs), Local Area Networks (LANs), and other networks that use wired or optical media for the transmission of data. The wireless communication systems comprise cellular telephone systems, satellite communication systems, Wireless Local Area Networks (WLANs), Wireless Personal Area Networks (WPANs), and other networks that employ a wireless link between a client device and a network infrastructure. Many client devices such as customer premise equipment (CPE) in hot spot are serviced by using a combination of wireless communication systems and wired communication systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for accessing navigation information via a global positioning group support server, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
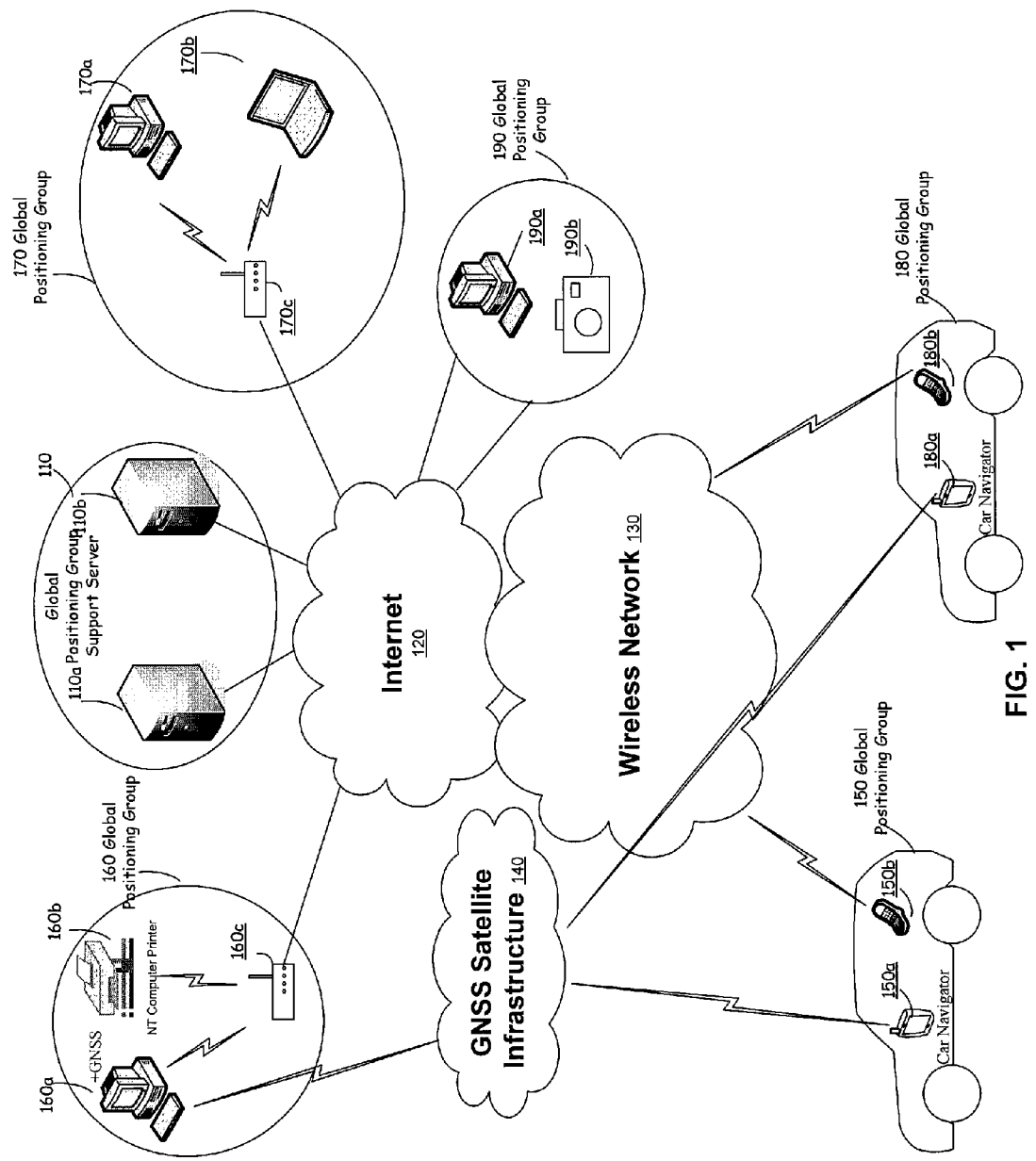
FIG. 1 is a block diagram illustrating an exemplary communication system that enables a client device to gain navigation information via a global positioning group support server, in accordance with an embodiment of the invention.

Certain embodiments of the invention may be found in a method and system for accessing navigation information via a global positioning group support server. Various aspects of the invention enable a client device to gain navigation information via a global navigation satellite system (GNSS) group support server, regardless of whether or not the client device comprises GNSS capability. The client device is operable to transmit a signal comprising an associated GNSS address to the global positioning group support server. The global positioning group support server is operable to generate navigation information of one or more global positioning groups in the vicinity of the client device based on the received GNSS address. The generated navigation information is transmitted to the client device via a supporting network such as the Internet and/or a wireless network. Upon the receipt of the navigation information, the client device is operable to display or present received navigation information to users via a user interface, for example, a graphical user interface displayed on the client device. The displaying or the presentation comprises visual and/or audio information. A global positioning group comprises a plurality of client devices which may or may not possess GNSS capability. For client devices that comprise GNSS capability, an associated GNSS address of the client device comprises an inherent GNSS address reflecting a true geographic location of the client device, for example, various GNSS capable client devices. For a client device without GNSS capability, in order to determine or acquire location information, the client device is operable to communicate with a neighboring GNSS capable client device through an independent pathway such as via the wireless network to share the GNSS address of the neighboring GNSS capable client device. The client device without GNSS capability is operable to use the GNSS address of the neighboring client device to access the global positioning group support server to gain navigation information such as map data. The map data comprises a base map or an incremental map view.

In the global positioning group support server, the client devices are registered based on corresponding GNSS addresses. The global positioning group support server is operable to group various client devices with associated icons in the serving area into one or more global positioning groups based on corresponding GNSS addresses. The global positioning group support server is enabled to add or remove a client device to or from a given global positioning group. Various features such as association tracking are supported by the global positioning group support server. For example, a client device is enabled to track another client device in use based on corresponding GNSS addresses. The association tracking feature comprises a mutual association tracking among the client devices. A particular time window is set to activate corresponding association tracking. Various applications are enabled via the association tracking feature, for example, phantom GNSS moving.

FIG. 1 is a block diagram illustrating an exemplary communication system that enables a client device to gain navigation information via a global positioning group support server, in accordance with an embodiment of the invention. Referring to FIG. 1, there is shown the system of FIG. 1 comprises a plurality of global positioning group support servers 110, of which a global positioning group support server 110a and a global positioning group support server 110b are illustrated, Internet 120, a wireless network 130, a GNSS satellite infrastructure 140, and a plurality of global positioning groups 150-190. Each of the plurality of global positioning groups comprises one or more client devices that are operable to communicate with the plurality of global positioning group support servers 110 via the Internet 120 and/or the wireless network 130.

Each of the plurality of global positioning group support servers 110 such as the global positioning group support server 110a comprises suitable logic, circuitry and/or code that are operable to communicate navigation information such as map data to client devices in the plurality of the global positioning groups 150-190. As is shown, a global positioning group is formed in various ways determined by the global positioning group support server 110a. For example, the global positioning groups 150 and 180 comprise a plurality of mobiles and each of the global positioning groups comprises client devices with GNSS capability such as a car navigator 150a or 180a, or client devices without GNSS capability such as a cell phone 150b or 180b. The global positioning group 160 comprises customer premise equipment (CPE) such as a computer with GNSS 160a and a network computer printer 160b without GNSS. The global positioning group 170 comprises various CPE such as a computer without GNSS 170a and a laptop without GNSS 170b. The CPE in the global positioning group 160 and 170 communicate with the Internet 120 via the access point (AP) 160c and/or the AP 170c, respectively. The global positioning group 190 comprises client devices with a direct Internet connection, for example, a computer 190a and a camera 190b, both without GNSS.

The global positioning group support server 110a is operable to register various client devices with associated addresses such as IP address and/or GNSS address. The GNSS address is a fixed-location address for a GNSS capable client device, for example, the computer 160a. However, the GNSS address may be a shared GNSS address for a client device without GNSS. For example, for the cell phone 150b in the global positioning 150, the GNSS address of the car navigator 150a may be shared to register the cell phone 150b with the global positioning support server 110a. In this regard, a client device without GNSS may gain GNSS via its global positioning neighbor in vicinity.

The global positioning support server 110a and/or 110b is configurable to support one or more global positioning groups. For example, the global positioning 150-180 may be supported by the global positioning support server 110a, while the global positioning support server 110b may support only the global positioning 190. In this case, the global positioning support server 110b may be running on a client device such as the computer 190a. The communications between the global positioning support server 110a and the global positioning support server 110b may be supported via the Internet 120.

In a global positioning support server such as the global positioning support server 110a, various exemplary functions comprising global positioning update may be triggered based on client device GNSS condition. For example, a client device such as the cell phone 150b enters into a regional restricted area such as child phone safe zone perimeter exceeded. A premises device such as the laptop 170b moves out of perimeter. The global positioning support server 110a is operable to enable tracking associations in either uni-direction or bi-direction. The global positioning support server 110a allows a client device being registered in one or more global positioning support servers. A global positioning support server such as 110a provides navigation information such as geographic map data relating to roads, highways, intersections or points of interest, for example. The navigation information also comprises routes or directions between a starting point and a destination. The global positioning support server 110a communicates the navigation information in streaming form or as data elements through the Internet 120 and/or a wireless network 130, to a client device such as the cell phone 150b.

The Internet 120 may comprise suitable logic, devices and/or code that enables data communication via various network wired and/or wireless technologies using IP protocols.

The wireless network 130 may comprise suitable logic, circuitry and/or code that are enabled to provide various wireless data services on a large-scale basis by using a particular technology such as GSM, UMTS, WiFi, or WiMAX.

In operation, a plurality of navigation servers such as the global positioning support server 110a and 110b coupled to the Internet 120 may provide navigation information to various client devices. The various client devices are registered with one or more global positioning groups formed by a global positioning support server such as the group support server 110a. The global positioning support server 110a is operable to register client devices by using associated IP address and/or GNSS addresses. In instances where a client device without GNSS such as the cell phone 180b, the cell phone 180b is operable to share the GNSS address of its global positioning neighbor such as the car navigator 180a, and register itself with associated IP address and/or the shared GNSS address at the global positioning support server 110a. The global positioning support server 110a is operable to provide navigation information through the Internet 1120 and/or the wireless network 130 to the cell phone 180b.

One or more global positioning groups are formed and supported by a single global positioning group support server such as the global positioning group support server 110a. A single client device is operable to associate with one or more global positioning group support servers depending on system configuration. Icons are selected for each of registered client devices upon associated global positioning group setup. The global positioning group support servers 110 is operable to provide navigation information such as map data via data traffic over the Internet 120 and/or the wireless network 130, onto corresponding client devices such as the cell phone 150b and 180b. Peer-to-Peer client device tracking is supported via the global positioning group support server 110 via uni-directional and bi-directional communication. Various exemplary functions such as global positioning group update are triggered based on GNSS conditions in serving areas.

Figure 2:
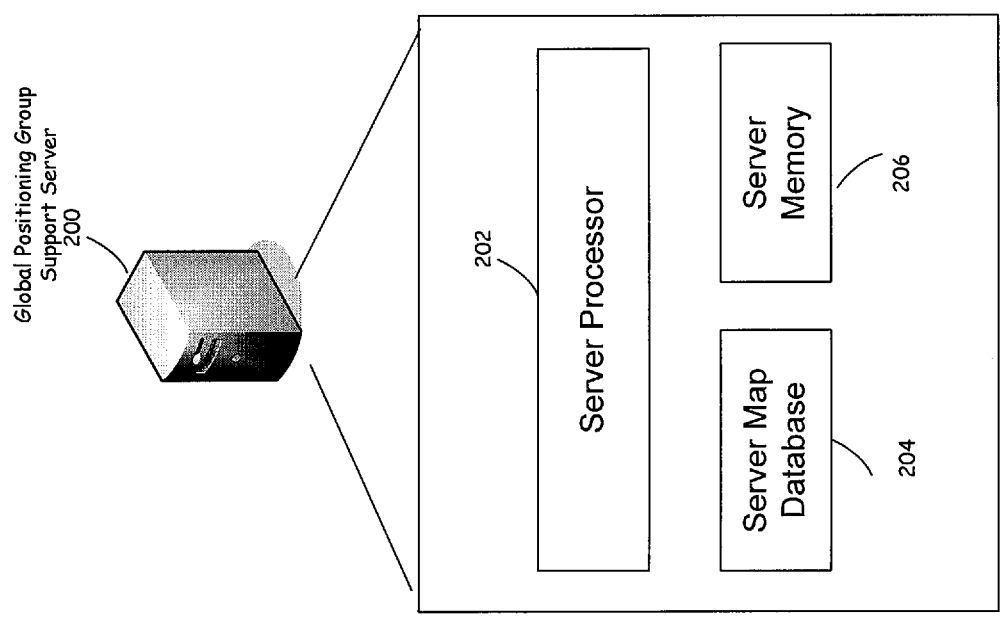
FIG. 2 is a block diagram illustrating an exemplary client device that is operable to gain navigation information via a global positioning group support server, in accordance with an embodiment of the invention.

FIG. 2 is a block diagram illustrating an exemplary terminal device that is operable to gain navigation information via a global positioning group support server, in accordance with an embodiment of the invention. Referring to FIG. 2, there is shown a global positioning group support server 200 comprising a server processor 202, a server map database 204, and a server memory.

The server processor 202 comprises suitable logic, circuitry, and/or code that are operable to control and/or handle data processing operations for the global positioning group support server 200. The server processor 202 enables processing and/or handling of IP/GNSS address registration when client devices are online. The server processor 202 is operable to support global positioning group setup and/or update. The server processor 202 determines whether to add or remove a client device to or from a given global positioning group based on various criteria stored in the server memory 206. An icon for each registered client device may be selected upon a global positioning group setup/update and is provided to client devices together with the navigation information required.

Various location based services may be supported by the global positioning group support server 200. For example, the global positioning group support server 200 is operable to utilize various algorithms stored in the memory 206 to acquire positional information for a given client device, to catalog one or more destinations, to search for IP/GNSS address-based routing pathways, and to authenticate the given client device for tracking associations, for example. A particular navigation-based service such as map viewing/tracking, temporary tracking associations, and phantom GNSS functionality is enabled or disabled via the server processor 202 for a given client device. The server processor 202 is operable to support communications with other independent global positioning group support servers via the Internet 120. The server processor 202 comprises various types of processor such as a microprocessor, a digital signal processor, an Application Specific Integrated Circuit (ASIC), or a combination of processing type devices. The server processor 202 is operable to execute a plurality of software instructions, which are stored in the server memory 206 and downloaded for execution. The server processor 202 also comprises specialized hardware required to implement particular aspects of the present invention.

The server map database 204 comprises suitable logic, circuitry, and/or code that enable storage of user's positional information together with associated icons, inherent labels, and user's address comprising IP address and/or GNSS address. The associated icons, inherent labels, and user's address may overlay some kind of characteristics of the corresponding client devices such as, for example, a restaurant icon comprises restaurant related addresses, restaurant names, and restaurant phone numbers. The GNSS address may be a GNSS address of a client device with GNSS or a shared GNSS address of a client device without GNSS.

The server memory 206 comprises suitable logic, circuitry, and/or code that are operable to enable storage of data and/or other information utilized by the global positioning group server 200. For example, the server memory 206 may be utilized to store processed data generated by the server processor 202. The server memory 206 is also utilized to store information, such as device configuration information, that may be utilized to control various operations of the global positioning group support server 200. The server memory 206 is operable to store information necessary to enable or disable a particular service for a given client device. The server memory 206 is also operable to store some executable instructions for a global positioning group setup and phantom GNSS resync, for example. One or more software to communicate via Internet for access to the global positioning group support server 200 is also stored in the memory 206. The server memory 206 comprises RAM, ROM, low latency non-volatile memory such as flash memory and/or other suitable electronic data storage capable of storing data and instructions.

In operation, the global positioning group support server 200 is communicatively coupled to the Internet 120. The server processor 202 is operable to handle IP/GNSS address registration when client devices are online. The server processor 202 is operable to group registered client devices into various global positioning groups. The server processor 202 is operable to provide navigation information stored in the server map database 204 to users of various client devices periodically or aperiodically. For example, when IP/GNSS address information is received from a given client device such as the cell phone 180b, the server processor 202 may record or store the received address information and access the server map database 204 to grasp the current position of the cell phone 180b and its global positioning group neighbors such as the cell phone 150b. Depending on implementation, the server processor 202 enables various functionalities such as map viewing, phantom GNSS, and tracking associations, on a given client device.

Figure 3:
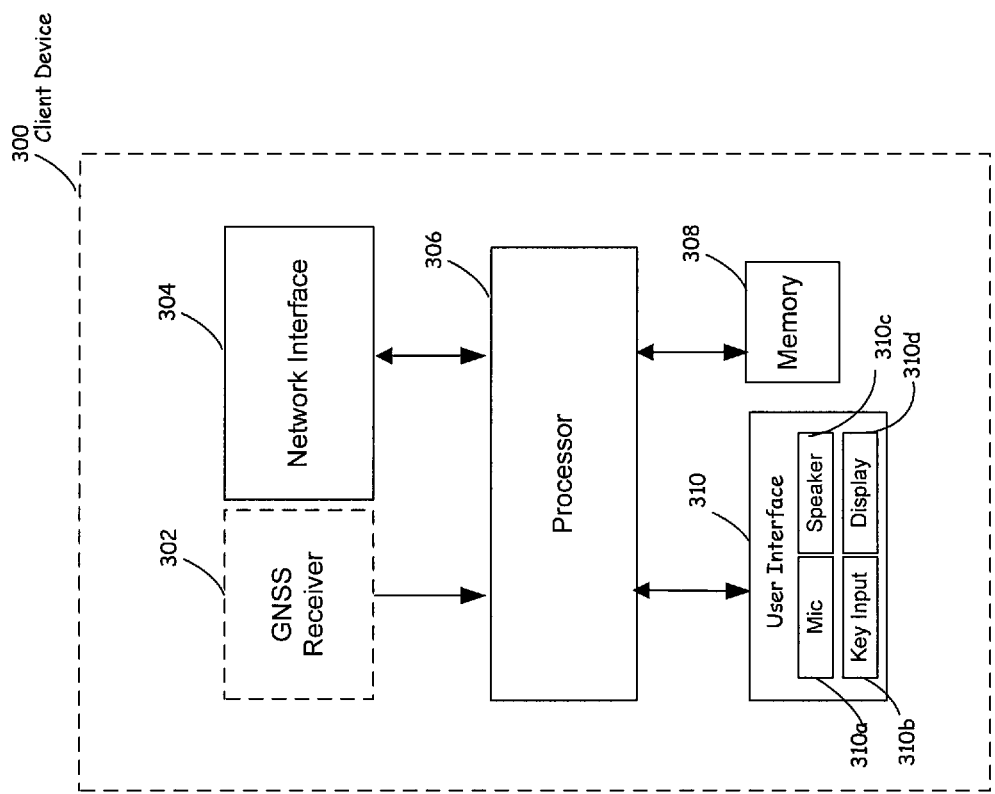
FIG. 3 is a block diagram illustrating an exemplary global positioning group support server that enables a client device to gain navigation information, in accordance with an embodiment of the invention.

FIG. 3 is a block diagram illustrating an exemplary navigation server that enables a client device to gain navigation information, in accordance with an embodiment of the invention. Referring to FIG. 3, there is shown a client device 300 comprising an optional GNSS receiver 302, a network interface 304, a processor 306, a memory 308, and a user interface 310 comprising various components, of which a microphone (Mic) 3108a, a key input 310b, a speaker 310c, and a display 310d are illustrated.

The GNSS receiver 302 comprises suitable logic, circuitry and/or code that are enabled to receive GNSS satellite broadcast signals and convert them to GNSS baseband signals. The GNSS baseband signals are further processing by the processor 306 so as to determine positional information of the client device 300.

The network interface 304 comprises suitable logic, circuitry and/or code that are enabled to transmit and/or receive radio signals over a network. The network may be wired or wireless. The communicated radio signals comprise navigational information from various global positioning group support servers 110.

The processor 306 comprises suitable logic, circuitry and/or code that are enabled to process received satellite signals as well as signals received from a supporting communication network. In instances where the GNSS receiver 302 is enabled, the processor 306 is configured to communicate associated GNSS address with the global positioning group support server 110a, for example, to acquire navigation information such as map data. In instances where the GNSS receiver 302 is unavailable, the processor 306 is enabled to share a GNSS address of an associated global positioning group neighbor with GNSS to gain GNSS from the global positioning group support server 110a, for instance, through the network interface 304 and/or the wireless network 130. The received navigation information may be stored in the memory 308 and/or and may be retrieved and presented to users via the user interface 310 such as the speaker 310c and/or the display 310d. The shared GNSS address may be entered through the key input 310b of the user interface 310.

The user interface 310 comprises suitable logic, circuitry and/or code that may service the client device 300 via entering user inputs and/or presenting various services to users. The user interface 310 comprises the microphone (Mic) 310a, the key input 310b, the speaker 310c, and the display 310d, and/or any other type of interface that is employed by the client device 300.

The memory 308 comprises suitable logic, circuitry, and/or code that enable storage of data and/or other information utilized by the processor 306. For example, the memory 308 is utilized to store processed data generated by the processor 302. The memory 308 is operable to store information, such as client device configuration information, that is utilized to control various operations of the client device 300. The memory 308 is also operable to store some executable instructions for running various services on the client device 300. Various navigation information received from the global positioning group support servers 110 are stored in the memory 308.

In operation, the client device 300 is enabled to register with one or more global positioning group support servers via associated IP/GNSS address. For the client device 300 without GNSS, the GNSS address indicates a shared GNSS address. The client device 300 participates in one or more global positioning groups such as 110a and 110b. The client device 300 is operable to receive or acquire navigation information such as a map from a global positioning group support server 110a. The navigation information is communicated via the Internet 120 and/or the wireless network 130 to the client device 300. The processor 306 is operable to coordinate with the memory 308 and the user interface 310 to display via the display 310d or otherwise present the received navigation information to a user via the user interface 310. The processor 306 is also operable to enable storage of the received navigation information in the memory 308. A user of the client device 300 triggers various services via the user interface 310 such as the microphone (Mic) 310a and the key input 310b. For instance, when the client device 300 is authorized for GNSS phantom moving, a user of the client device 300 enters the selection of one or more fake destinations via the key input 310b of the user interface 310. The processor 306 is operable to process the user interface commands and send selected destinations to the global positioning group support server 110a. The client device 300 is operable to start phantom moving from, for example, a particular place to a fake destination, which was entered by the user via the user interface 310. The user is capable of ending phantom moving by, for example, pressing a button on the user interface 310, followed by sending the actual GNSS of the client device 300 to the global positioning group support server for phantom GNSS resync.

Figure 4:
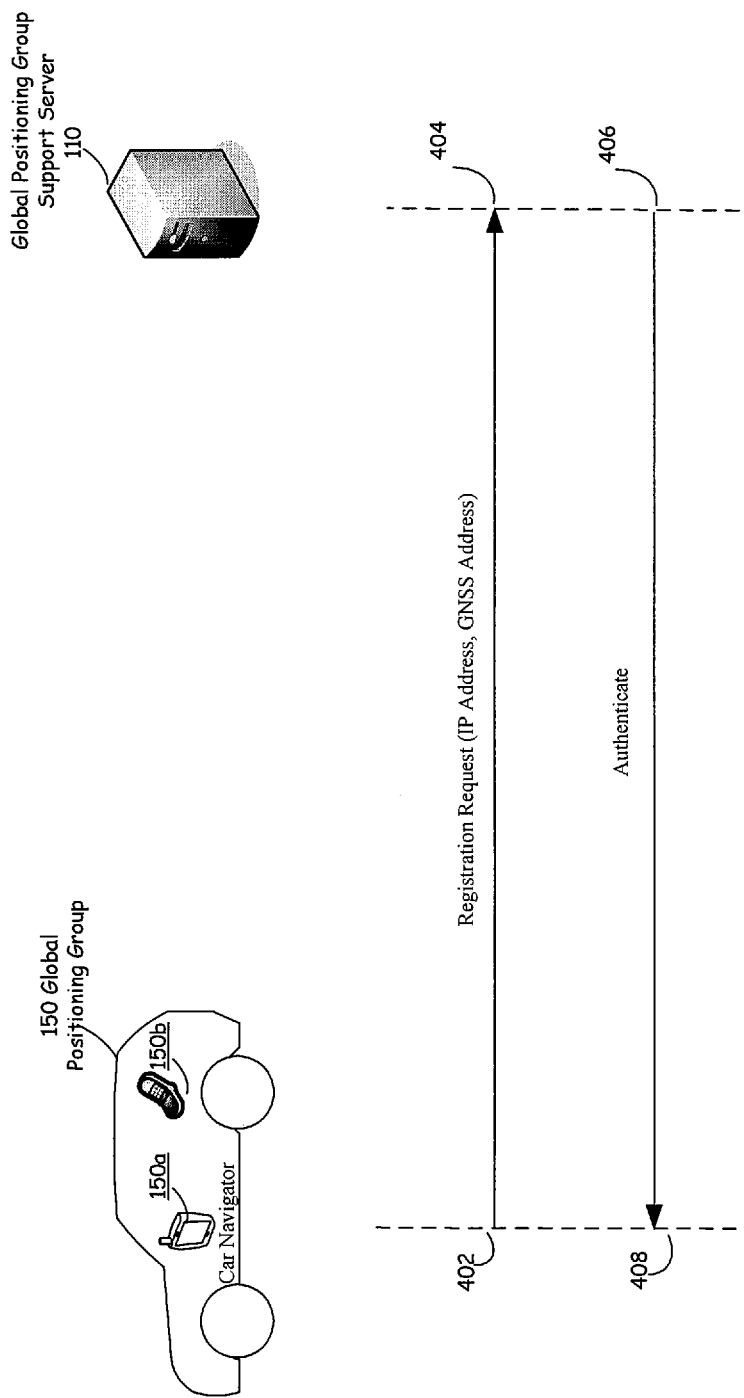
FIG. 4 is a flow chart illustrating an exemplary client device registration procedure, in accordance with an embodiment of the invention.

FIG. 4 is a flow chart illustrating an exemplary client device registration procedure, in accordance with an embodiment of the invention. Referring to FIG. 4, the exemplary steps start with the step 402, where a client device such as the cell phone 150b is online and wants to access the global positioning group support server 110a to gain navigation information such as map data. The cell phone 150b would typically send a register request comprising an associated IP address and/or a GNSS address. However, since the cell phone 150b has no GNSS capability, it is operable to share a GNSS address of its global positioning group neighbor, such as the car navigator 150a and utilize this shared GNSS address for the resister request. In one embodiment of the invention, the shared GNSS address is entered by the user of the cell phone 150b via the user interface 310.

In step 404, the global positioning group support server 110a is operable to receive the registration request from the cell phone 150b via the wireless network 130 and the Internet 120. The global positioning group support server 110a records the received IP/GNSS address. The server processor 202 applies various security protocols for device security check such as device identity check for intrusion detection. The global positioning group support server 110a informs the cell phone 150b whether the cell phone is authorized to be registered at the global positioning group support server 110a. In step 408, in instances where the registration request is rejected, the cell phone 150b is operable to try to register with another global positioning group support server such as the global positioning group support server 110b. In instances where the global positioning group support server 110b authorizes the access from the cell phone 150b, then the cell phone 150b stores the global positioning group support server 110b information to be used for gaining navigation information from the global positioning group support server 110b in the future.

Figure 5:
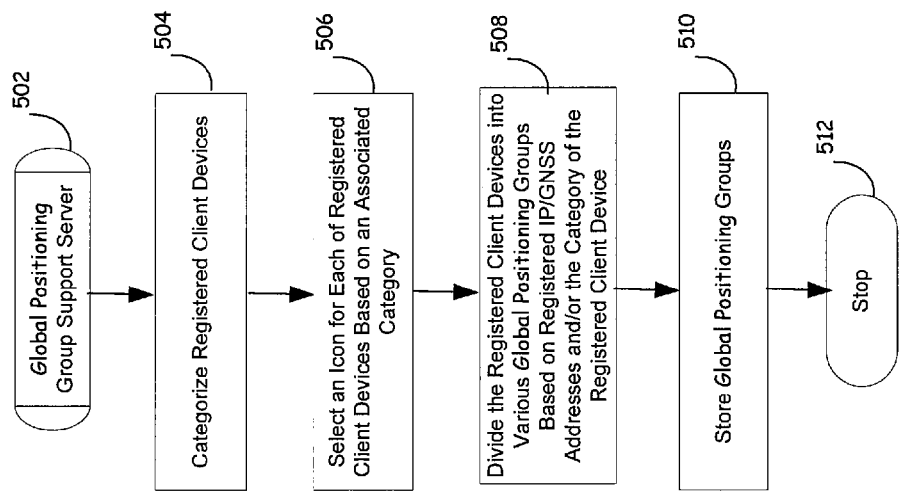
FIG. 5 is a flow chart illustrating an exemplary global positioning group setup procedure, in accordance with an embodiment of the invention.

FIG. 5 is a flow chart illustrating an exemplary global positioning group setup procedure, in accordance with an embodiment of the invention. Referring to FIG. 5, the exemplary global positioning group setup procedure starts with the step 502, where a global positioning group support server such as the global positioning group support server 110a receive requests for the start of various navigation services to registered client devices via the Internet 120 and/or the wireless network 130. In the step 504, the global positioning group support server 110 categorizes the registered client devices based on characteristics of the registered client devices, for example, registered IP/GNSS addresses indicates a restaurant or a park. In step 506, an icon is selected from the server memory 206 for each registered client device based on the associated category.

In step 508, the registered client devices are grouped into various global positioning groups based on registered IP/GNSS addresses and the category of the registered client device. In step 510, the global positioning groups are setup and then stored at the global positioning group support server 110a. The exemplary global positioning group setup procedure stops in step 512.

Figure 6:
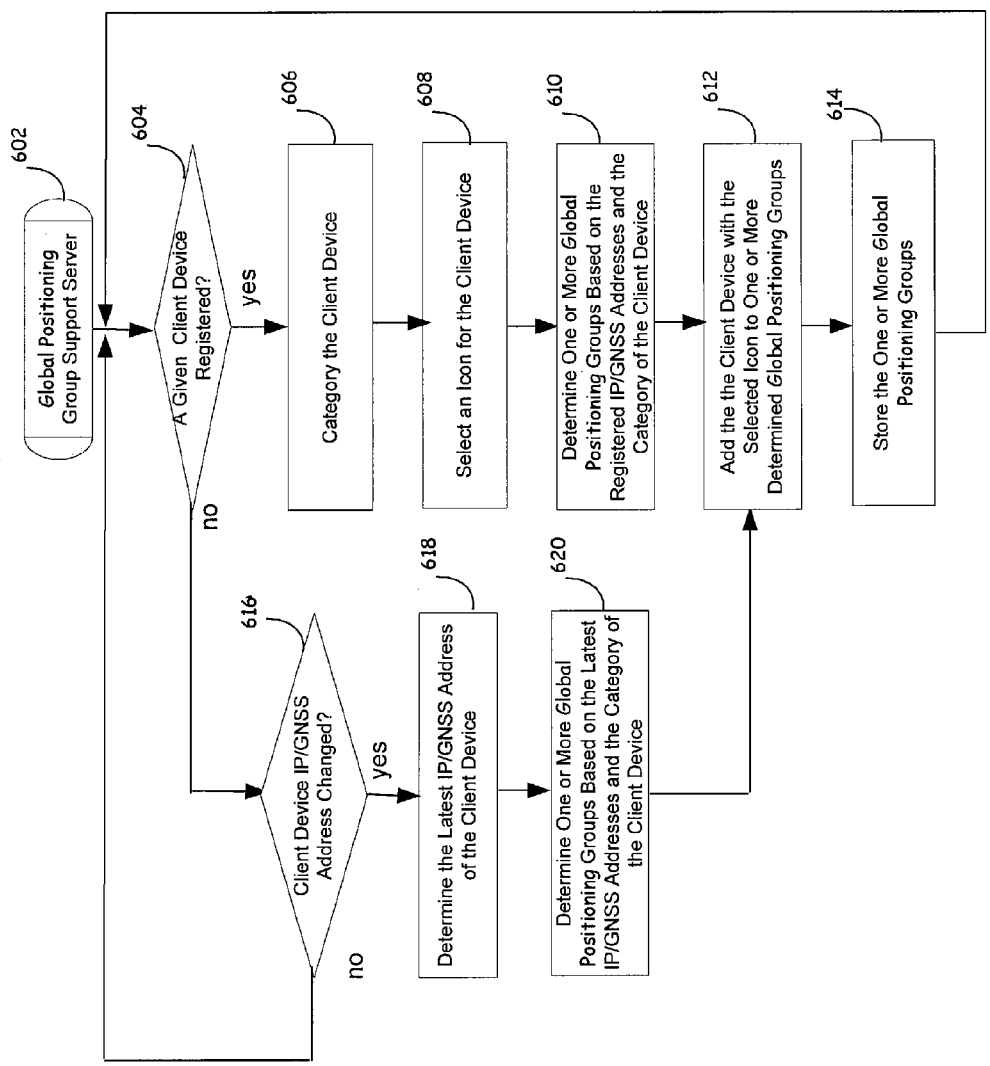
FIG. 6 is a flow chart illustrating an exemplary procedure for adding a client device to a global positioning group, in accordance with an embodiment of the invention.

FIG. 6 is a flow chart illustrating an exemplary procedure for adding a client device to a global positioning group, in accordance with an embodiment of the invention. Referring to FIG. 6, the exemplary steps start with the step 602, where a global positioning group support server such as 110a completes the global positioning group set up as described with respect to FIG. 5. In step 604, the global positioning group support server 110 determines whether a given client device, which currently is not associated with global positioning groups supported by the global positioning group support server 110a, is already been registered at the global positioning group support server 110a. In instances where the given client device is registered at the global positioning group support server 110a, then in step 606, the global positioning group support server 110a categorizes the client device such as, for example, sports and park, based on characteristics of the client device. In step 608, an icon is selected from the server memory 206 for the client device based on the determined category for the client device. In step 610, one or more global positioning groups are chosen based on the registered IP/GNSS address and the category of the client device. In step 612, the client device with the selected icon is added to the one or more global positioning groups. In step 614, the one or more global positioning groups may be stored. The exemplary steps return to the step 604.

In step 604, in instances where the given client device is not registered at the global positioning group support server 110a, then in step 616, the global positioning group support server 110a determines whether the IP/GNSS address of the given client device has changed since last global positioning group update. In instances where the IP/GNSS address of the given client device has changed since last global positioning group update, the in step 618, it is determined whether the latest IP/GNSS address of the given client device. In step 620, one or more global positioning groups are determined or identified based on the latest IP/GNSS address and the category of the given client device. The exemplary steps continue with step 612.

Figure 7:
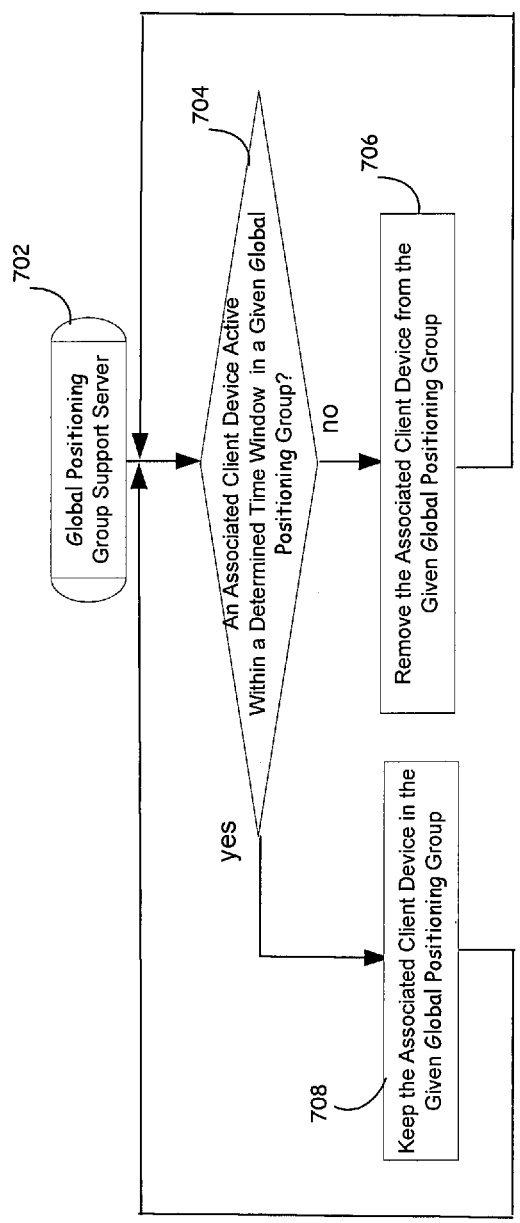
FIG. 7 is a flow chart illustrating an exemplary procedure for removing a client device from a global positioning group, in accordance with an embodiment of the invention.

FIG. 7 is a flow chart illustrating an exemplary procedure for removing a client device from a global positioning group, in accordance with an embodiment of the invention. Referring to FIG. 7, the exemplary steps start with the step 702, where a global positioning group support server such as 110a completes global positioning group set up as described with respect to FIG. 5. In step 704, in a given global positioning group, the global positioning group support server 110a determines whether an associated client device of the given global positioning group is active within a determined time window. The determined time window may be implementation dependent. In instances where the associated client device is not active within the determined time window in the given global positioning group, then in step 706, the associated client device is removed from the given global positioning group and the exemplary steps return to the step 704. In step 704, in instances where the associated client device is active within the determined time window, then in step 708, the associated client device is kept in the given global positioning group. The exemplary steps return to the step 704.

Figure 8:
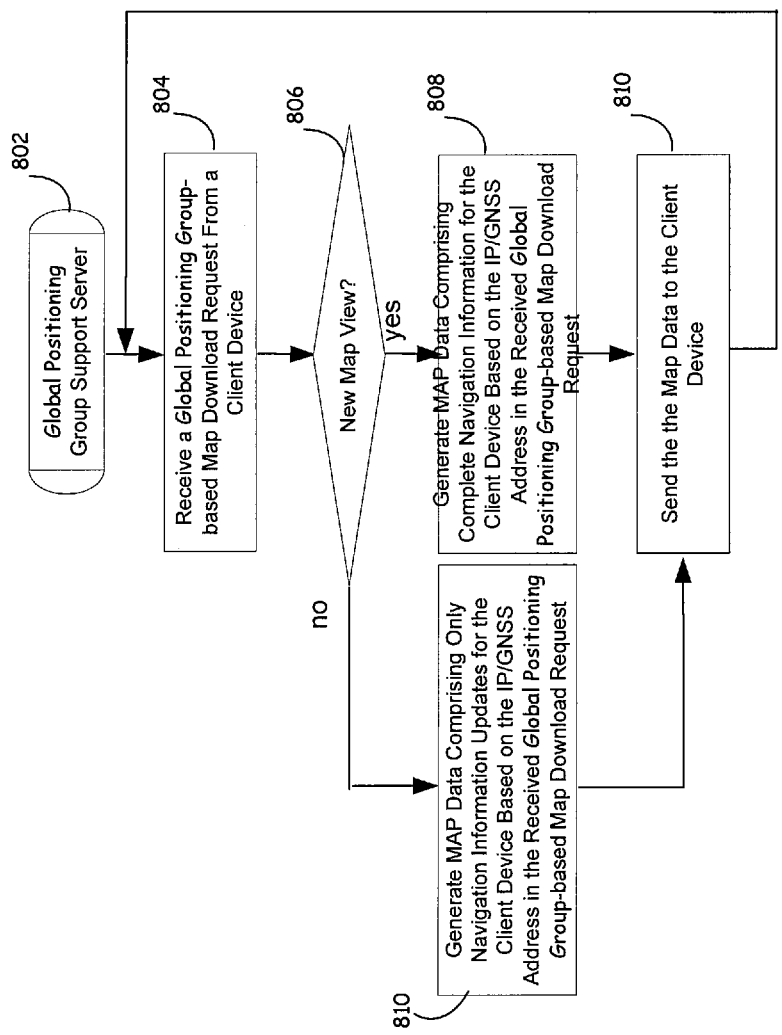
FIG. 8 is a flow chart illustrating an exemplary procedure for creating and updating map viewing via a global positioning group support server, in accordance with an embodiment of the invention.

FIG. 8 is a flow chart illustrating an exemplary procedure for creating and updating map viewing via a global positioning group support server, in accordance with an embodiment of the invention. Referring to FIG. 8, the exemplary steps start with the step 802, where a global positioning group support server such as 110a may complete global positioning group set up as described in FIG. 5. In step 804, the global positioning group support server 110a may receive a global positioning group-based map download request from an associated client device via a supporting network such as the Internet 120 and/or the wireless network 130. The global positioning group-based map download request comprises the IP/GNSS address of the associated client device. The global positioning group-based map download request is used to acquire various map data comprising navigation information such as, for example, directions in a graphical and/or textual format, a map segment of varying detail, or other navigation information. In step 806, the global positioning group support server 110a determines whether the received global positioning group-based map download request is for acquiring a new map view. In instances where a new map view is requested from the associated client device, then the exemplary steps continues in step 808, where the GNSS support group server 110a generates map data with complete navigation information associated with the IP/GNSS address indicated in the received global positioning group-based map download request. In step 810, the global positioning group support server 110a sends the generated map data via a supporting network such as the Internet 120 and/or the wireless network 130 onto the associated client device. The exemplary steps then returns to the step 804. In step 806, in instances where the received global positioning group-based map download request is for acquiring a subsequent map view (map view tracking), the in step 810, the global positioning group support server generates map data comprising only navigation information updates for the associated client device based on the IP/GNSS address indicated in the received global positioning group-based map download request. The exemplary steps continue in step 810.

Figure 9:
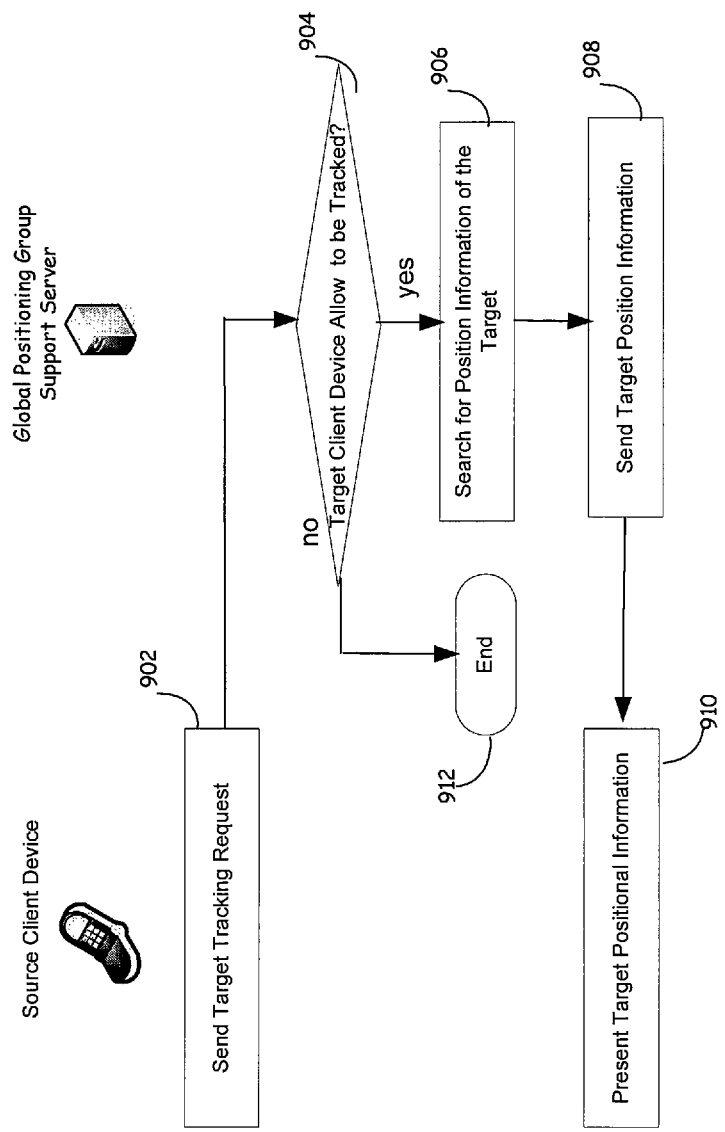
FIG. 9 is a flow chart illustrating an exemplary device uni-direction tracking procedure via a global positioning group support server, in accordance with an embodiment of the invention.

FIG. 9 is a flow chart illustrating an exemplary device uni-direction tracking procedure via a global positioning group support server, in accordance with an embodiment of the invention. Referring to FIG. 9, the exemplary steps start with the step 902, where a source client device wishes to learn the current position of a target client device currently in use. The source client device sends a target tracking request to associated global positioning group support servers such as 110a. The target tracking request comprises the target client device information in a predetermined format, for example, telephone number of the target client device and/or inherent identification label of the target client device. The source client device and the target client device is associated with the same global positioning group or different global positioning groups supported by a single global positioning group support server or by multiple independent global positioning group support servers. The multiple independent global positioning group support servers communicate with each other via the Internet 120.

In step 904, upon the receipt of the target tracking request, the global positioning group support server 110a identifies the target client device based on the transmitted target client device information such as the telephone number of the target client device. Thereafter, the global positioning group support server 110a communicates with the target client device via a supporting network such as the Internet 120 and/or the wireless network 130 to determine whether or not the target client device allows tracking by the source client device. In instances where the target client device allows tracking by the source client device, then in step 906, the global positioning group support server 110a does a search in the server map database 204 for current positional information of the target client device. In step 908, the global positioning group support server 110a sends the current positional information of the target client device, which has been found as the result of the search, onto the source client device. In step 910, upon the receipt of the current positional information of the target client device, the source client device is enabled to present the received current positional information of the target client device via the user interface 310. The positional information may be presented in audio via the speaker 310c and/or visual format via the display 310. In step 904, in instances where the target client device does not allow to be tracked by the source client device, the global positioning group support sever informs the source client device of that effect. The exemplary steps end in step 912.

Figure 10:
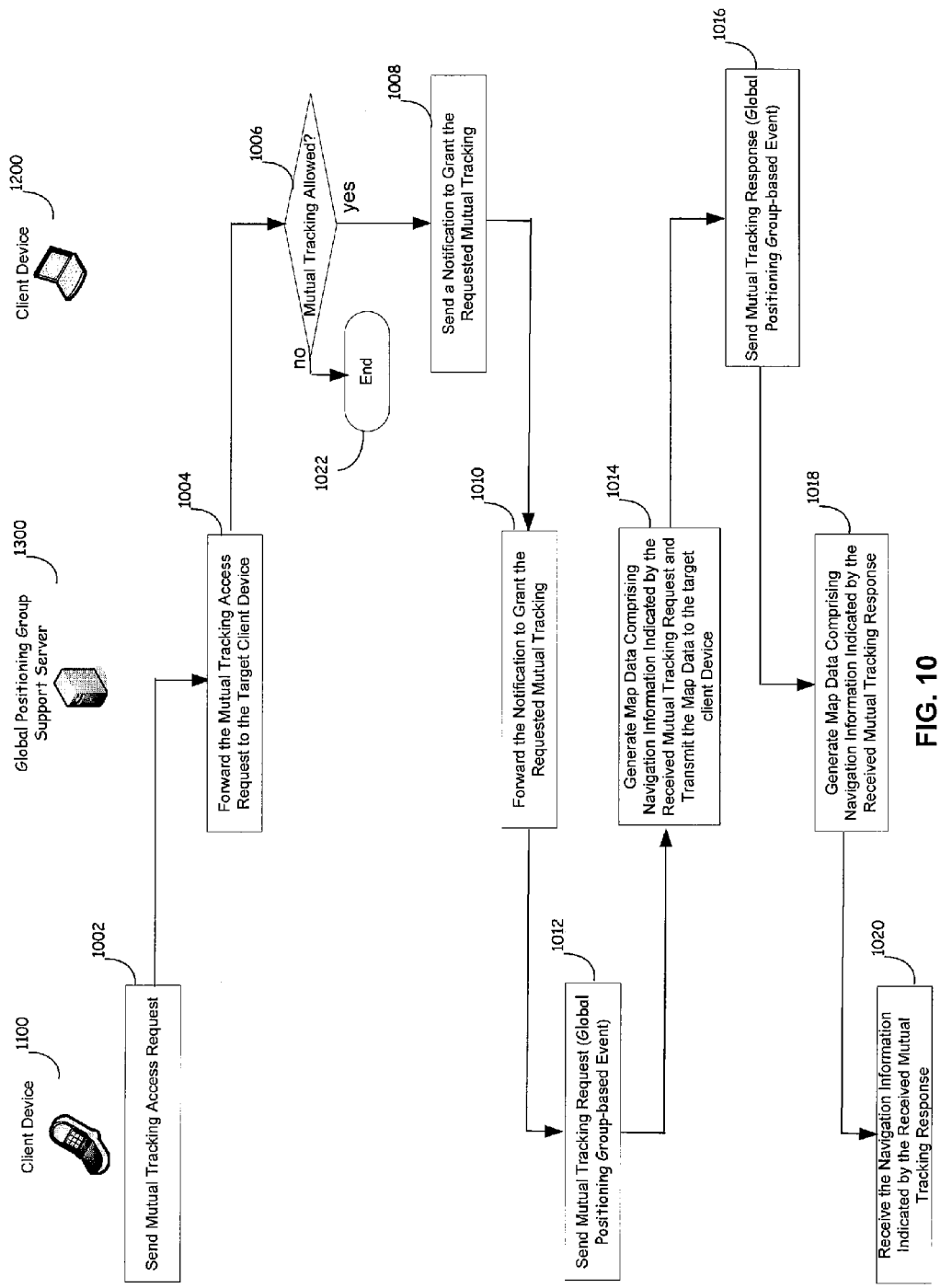
FIG. 10 is a flow chart illustrating an exemplary client device mutual tracking procedure, in accordance with an embodiment of the invention.

FIG. 10 is a flow chart illustrating an exemplary client device mutual tracking procedure, in accordance with an embodiment of the invention. Referring to FIG. 10, the exemplary steps start with the step 1002, where a client device 1100 wished to interact with another client device 1200 currently in use. The client device 1100 sends a mutual tracking access request to an associated global positioning group support server 1300. The mutual tracking access request comprise the client device 1200 specific information in a predetermined format, for example, telephone number of the client device 1200 and/or inherent identification label of the client device 1200. The client device 1100 and the client device 1200 are associated with the same global positioning group or different global positioning groups that are supported by a single global positioning group support server such as the global positioning group support server 1300 or by multiple independent global positioning group support servers. The multiple independent global positioning group support servers may communicate each other via the Internet 120.

In step 1004, upon the receipt of the mutual tracking access request from the client device 1002, the global positioning group support server 1300 identifies the client device 1200 based on the transmitted client device 1200 specific information. Thereafter, the global positioning group support server 1300 communicates with the client device 1200 via a supporting network such as the Internet 120 and/or the wireless network 130 to notify the intend of the mutual tracking access request from the client device 1100. In step 1006, the client device 1200 determines whether or not to authorize the mutual access request from the client device 1100. In instances where the client device 1200 accepts the mutual tracking request from the client device 1100, then in step 1008, where the client device 1200 sends a notification to grant the requested mutual access tracking. In step 1010, the global positioning group support server 130 forwards the notification to the client 1100. In step 1012, upon the receipt of the service grant notification, the client device 1100 sends a mutual tracking request comprising one or more global positioning group-based events.

In step 1014, the global positioning group support server 1300 searches the server map database 204 based on the received global positioning group-based events and generates map data comprising navigation information associated with the global positioning group-based events in the received mutual tracking request from the client device 110. The generated map data is then transmitted to the client device 1200 via a supporting network such as the Internet 120 and/or the wireless network 130. In step 1016, upon the receipt of the map data from the global positioning group support server 130, the client device 1200 generates a mutual tracking response comprising the client device 1200 decision such as rejection, acceptation, or modification in regard to the request of the client device 1100. In step 1018, upon the receipt of the mutual tacking response from the client device 1200, the global positioning group support server 130 generates map data comprising navigation information reflecting the received mutual tacking response. In step 1020, the client device 1100 receives the map data with the navigation information associated with the response from the client device 1200. The exemplary steps are then repeated.

In accordance with various embodiments of the invention, the client device 1100 and/or the client device 1200 are operable initiate the mutual tracking request. The mutual tracking request is accepted, rejected, or modified by the peer client device of the request. For example, it is desirable for the client device 1100 to setup a meeting with the client device 1200 at a determined time window at a given place. The client device 1100 is configured to send a mutual tracking request regarding this meeting setup to the client device 1200. Upon receipt of the request, the client device 1200 is operable to accept, reject, and modify the request, and inform the client device 1100 via a mutual tracking response. For instance, the client device 1200 is operable to reduce or move the determined time window and/or change the meeting date.

Figure 11:
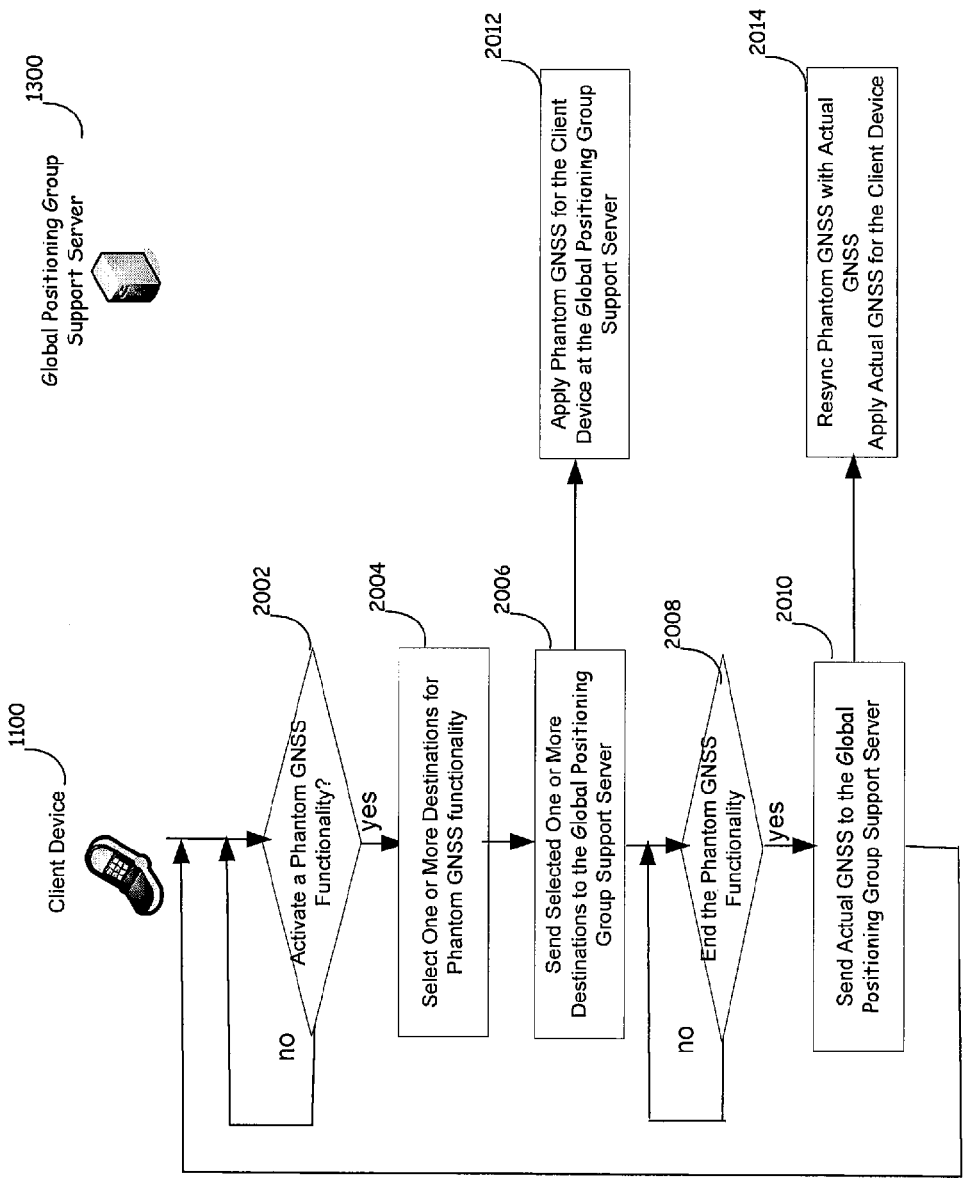
FIG. 11 is a flow chart illustrating phantom GNSS function, in accordance with an embodiment of the invention.

FIG. 11 is a flow chart illustrating phantom GNSS function, in accordance with an embodiment of the invention. Referring to FIG. 11, the exemplary steps start with the step 2002, where a client device 1100 is associated with a global positioning group support server 1300 which completes global positioning group set up as described with respect to FIG. 5. The client device 1100 determines whether or not to activate a phantom GNSS functionality. In instances where the client device 1100 wishes to activate the phantom GNSS functionality, then in step 2004, where one or more destinations are selected by the user of the client device 110 and entered via the key input 310b of the user interface 310, for example.

In step 2006, the client device 1100 sends the selected one or more destinations to the global positioning group support server 1300. In step 2012, upon receipt of the selected one or more destinations from the client device 1100, the global positioning group support server 1300 applies phantom GNSS functionality by using the selected one or more destinations for the client device 1100. In step 2008, the client device 1100 may determine whether or not to end the phantom GNSS functionality. In instances where the phantom GNSS functionality of the client device 1100 is ended via, for example, inputs of the user interface 310. In step 2010, the client device 1100 is enabled to send its actual GNSS information to the global positioning group support server 1300. The exemplary steps return to the step 2002.

In step 2014, upon the receipt of the actual GNSS from the client device 1100, the global positioning group support server 1300 is operable to resynchronize the on-going phantom GNSS functionality with the received actual GNSS. The actual global positioning group-based navigation information is then applied to the client device 1100. In step 2002, in instances where the client device 1100 does not wish to be in the phantom GNSS functionality, then execution remains in the step 2002. In step 2008, in instances where the client device 1100 does not wish to end the phantom GNSS functionality, then stay in step 2008.

Aspects of a method and system for accessing navigation information via a global positioning group support server are provided. In accordance with various embodiments of the invention, a client device such as the cell phone 150b in the system of FIG. 1 is operable to transmit a signal comprising an associated GNSS address to a navigation server such as the global positioning group support server 110a, even the cell phone 150b has no GNSS capability. The global positioning group support server 110a is operable to initiate a search within the server map database 204 to generate navigation information of one or more global positioning groups in vicinity of the cell phone 150b based on the received GNSS address. The generated navigation information is transmitted onto the cell phone 150b via a supporting network such as the Internet 120 and/or the wireless network 130.

Upon the receipt of the navigation information, the cell phone 150b is operable to present the received navigation information via the user interface 310 to users, accordingly. As is shown in FIG. 1, a global positioning group comprises a plurality of client devices such as, for example, the computer with GNSS 160a, the network computer printer 160b, and the access point 160c for the global positioning group 160. The plurality of client devices may or may not have GNSS capability. An associate GNSS address of a client device may be an inherent GNSS address reflecting a true geographic location of the client device, for example, the car navigator 150a. However, for many client devices without GNSS capability, for example, the cell phone 150b, to gain a GNSS, the cell phone 150b is operable to communicate with a neighboring GNSS capable client device through an independent pathway such as via the wireless network 130 to share the GNSS address of the neighboring GNSS capable client device such as the car navigator 150a.

The cell phone 150b uses the shared GNSS address to access the global positioning group support server 110a, for example, to gain navigation information such as map data. The map data is a base map or an incremental map view, as described in FIG. 8. In a global positioning group support server such as 110a, the client devices are registered based on corresponding GNSS addresses, whether inherent GNSS address or shared GNSS addresses, as shown in FIG. 4. The global positioning group support server 110a groups various client devices with associated icons in the serving area into one or more global positioning groups based on corresponding GNSS addresses, as described with respect to FIG. 5 and FIG. 6. The global positioning group support server 110a is enabled to add or remove a client device to or from a particular global positioning group as described in FIG. 7 and FIG. 8, respectively. Moreover, various features such as tracking associations are supported by the global positioning group support server 110a. For example, a client device in the system FIG. 1 is operable to track another client device in use based on corresponding GNSS addresses following the procedure described in FIG. 9.

The association tracking feature comprises a mutual tracking among the client devices in the system of FIG. 1 as described with respect to FIG. 10. A particular time window is set for corresponding tracking. Various applications are enabled via association tracking feature, for example, phantom GNSS moving as shown in FIG. 11. As described in the system of FIG. 1, a client device without a GNSS such as the cell phone 150b is operable to locate a neighboring client device with a GNSS such as the car navigator 150a via various ways. The cell phone 150b is enabled to acquire the GNSS address of the car navigator 150a via, for example, the Internet 120 and/or the wireless network 130. The acquired GNSS address of the car navigator 150a is utilized by the cell phone 150b to communicate with other communication devices such as the global positioning group support server 110a.

The cell phone 150b is operable to register itself to the global positioning group support server 110a and communicates with other client devices associated with the global positioning group support server 110a. The cell phone 150b is operable to acquire various location information such as map data of the cell phone 150b based on its associated GNSS address. The cell phone 150b is operable to associate with one or more global positioning group support servers and each global positioning group support server is enabling to manage one or more client devices.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for accessing navigation information via a global positioning group support server.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving, at a client device, a global navigation satellite system (GNSS) address of a neighboring client device;
registering with a navigation server, wherein the registering comprises:
sending, from the client device, a request to a navigation server to register the client device with a global positioning group of client devices that includes the neighboring client device, wherein the request to register includes the received GNSS address of the neighboring client device and an internet protocol (IP) address of the client device;
receiving, at the client device from the navigation server, an indication of the client device being registered with the global positioning group;
communicating to the navigation server a request for navigation information, the request including the received GNSS address of the neighboring client device; and
receiving, at the client device from the navigation server, navigation information of the global positioning group retrieved by the navigation server for the client device using the GNSS address of the neighboring client device.

2. The method according to claim 1, wherein registering the client device with the navigation server comprises registering the client device with the global positioning group based at least in part on the GNSS address of the neighboring client device and a category associated with the client device.

3. The method according to claim 1 wherein receiving a GNSS address of a neighboring client device comprises receiving the GNSS address over a wireless network.

4. The method according to claim 1 wherein receiving navigation information comprises receiving map data or associated supplemental information or both.

5. The method according to claim 4 wherein receiving associated supplemental information comprises receiving information defining routes or directions between a starting point and a destination.

6. The method according to claim 1 further comprising tracking a particular client device by the client device during a specified time window based on a corresponding GNSS address associated with the particular client device.

7. The method according to claim 1 further comprising communicating with another client device registered with the global positioning group based at least in part on the GNSS address of the neighboring client device.

8. The method according to claim 1 further comprising:
storing at the client device information about the navigation server; and
subsequently, using the stored information about the navigation server, requesting navigation information from the navigation server.

9. The method according to claim 1 wherein wherein communicating a request for navigation information comprises:
communicating to the navigation server the IP address of the client device; and
communicating to the navigation server a request for desired map data, the request including the GNSS address of the neighboring client device and the IP address of the client device for use by the navigation server in retrieving the desired map data for communication by the navigation server to the client device.

10. A client device comprising:
a processor configured to share data defining a global navigation satellite system (GNSS) address of a neighboring client device;
a network interface in data communication with the processor and configured to
send to a remotely located navigation server data defining a request to register the client device with a global positioning group of client devices that includes the neighboring client device, the request to register including the shared GNSS address of the neighboring client device, an internet protocol (IP) address of the client device and identification information for the client device,
receive from the navigation server data defining an indication of registration of the client device with the global positioning group;
communicate to the navigation server a request for navigation information, the request including the shared GNSS address of the neighboring client device; and
receive from the navigation server navigation information of the global positioning group retrieved by the navigation server for the client device in response to the request for navigation information using the GNSS address of the neighboring client device.

11. The client device of claim 10 further comprising:
memory in data communication with the processor and configured to store the data defining the GNSS address of the neighboring client device.

12. The client device of claim 11 wherein the memory is further configured to store data about the navigation server and wherein the processor is configured to retrieve the stored data about the navigation server and to send to the navigation server data defining the request for navigation information including the GNSS address of the neighboring client device and the IP address of the client device and identification information for the client device for use by the navigation server in retrieving the requested navigation information for the client device.

13. The client device of claim 10 wherein the network interface is configured to receive from the neighboring client device the data defining the GNSS address of the neighboring client device.

14. The client device of claim 10 wherein the client device is configured to locate the neighboring client device to share the data defining the GNSS address of the neighboring client device and wherein the network interface is configured to receive the data defining the GNSS address of the neighboring client device.

15. The client device of claim 10 wherein the client device is configured to communicate with another client device registered with the global positioning group based at least in part on the GNSS address of the neighboring client device.

16. The client device of claim 10 where the client device is configured to receive from the navigation server data declining registration with the navigation server and in response to send to an alternate navigation server data defining an alternate request to register the client device with an alternate global positioning group of client devices that includes the neighboring client device, the alternate request to register including the shared GNSS address of the neighboring client device and identification information for the client device.

17. A method comprising:
at a server system,
receiving from a client device a registration request for registration of the client device with the server system, including
receiving an internet protocol (IP) address of the client device, and
receiving a shared global navigation satellite system (GNSS) address shared by the client device with another client device;
storing the IP address of the client device;
using the received IP address and the received shared GNSS address,
registering the client device with a global positioning group of client devices that includes the other client device;
sending a registration indication to the client device;
subsequently, receiving from the client device a request for navigation information of the global positioning group, including
receiving the IP address of the client device, and
receiving a shared GNSS address shared by the client device with the global positioning group;
retrieving navigation information of the global positioning group using the received IP address of the client device and the received shared GNSS address shared by the client device with the global positioning group; and
sending the navigation information of the global positioning group to the client device.

18. The method of claim 17 further comprising:
using the received IP address of the client device, confirming identity of the client device before registering the client device.

19. The method of claim 18 further comprising:
at the server system, associating the received IP address of the client device and the shared GNSS address of the global positioning group with a category; and
assigning the client device and the other client device to the global positioning group according to the category.

20. The method of claim 19 further comprising:
grouping the client device and the other client device into one or more additional global positioning groups using the received IP address of the client device, the shared GNSS address and the category;
storing data defining the one or more global positioning groups; and sending to the client device information identifying the one or more global positioning groups.

* * * * *

UNITED STATES PATENT AND TRADEMARK OFFICE
CERTIFICATE OF CORRECTION

PATENT NO. : 8,838,145 B2
APPLICATION NO. : 12/323414
DATED : September 16, 2014
INVENTOR(S) : James Bennett et al.

It is certified that error appears in the above-identified patent and that said Letters Patent is hereby corrected as shown below:

In the Claims

In column 15, claim 9, line 15, after "according to claim 1" delete "wherein" (second occurrence).

Signed and Sealed this
Twenty-third Day of December, 2014

Michelle K. Lee
*Deputy Director of the United States Patent and Trademark Office*